Aug. 1, 1944.   W. H. BASELT   2,354,973
CLASP BRAKE
Filed Nov. 21, 1941   3 Sheets-Sheet 1

INVENTOR.
Walter H. Baselt
BY
ATTORNEY

Aug. 1, 1944.  W. H. BASELT  2,354,973
CLASP BRAKE
Filed Nov. 21, 1941  3 Sheets-Sheet 2
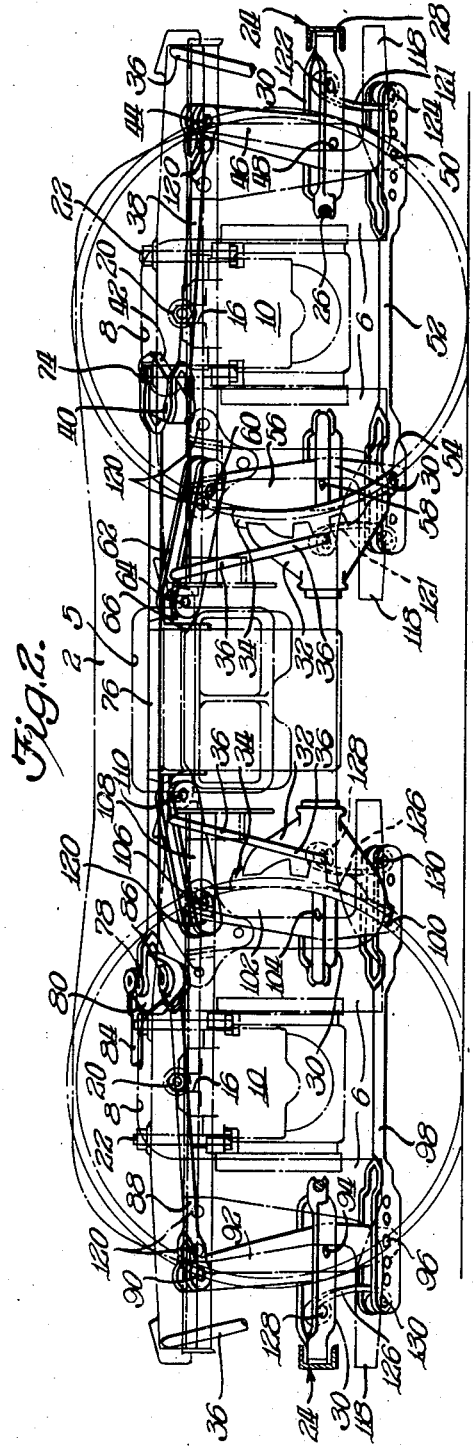
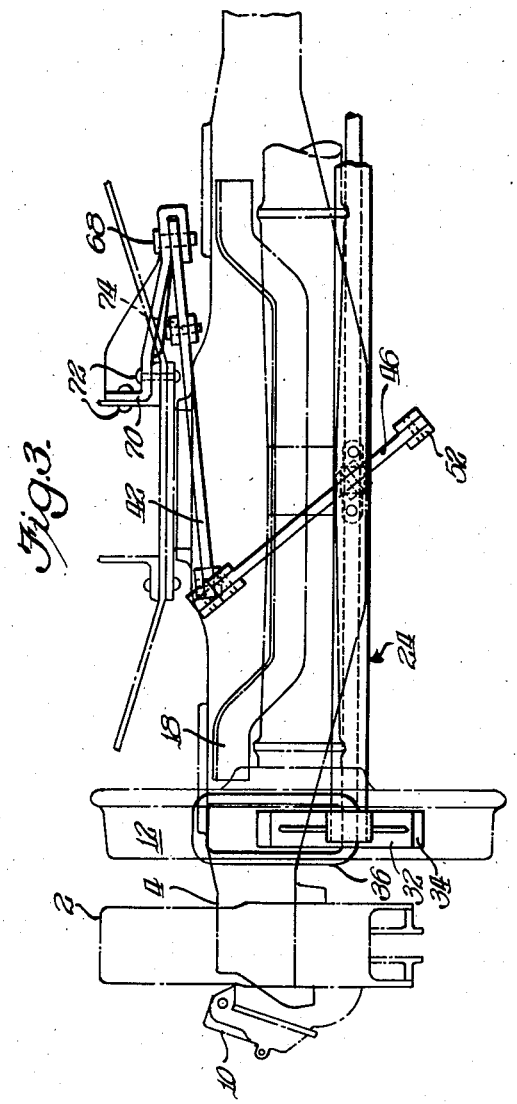
INVENTOR.
Walter H. Baselt
BY
ATTORNEY:

Aug. 1, 1944.     W. H. BASELT     2,354,973
CLASP BRAKE
Filed Nov. 21, 1941     3 Sheets-Sheet 3

INVENTOR
Walter H. Baselt
BY
ATTORNEY

Patented Aug. 1, 1944

2,354,973

UNITED STATES PATENT OFFICE 2,354,973

CLASP BRAKE

Walter H. Baselt, Chicago, Ill., assignor to American Steel Foundries, Chicago, Ill., a corporation of New Jersey Application November 21, 1941, Serial No. 419,953

17 Claims. (Cl. 188—56)

My invention relates to a brake arrangement for a railway car truck and more particularly to a type of brake arrangement commonly designated clasp brake wherein brake heads and brake shoes are applied at opposite sides of each wheel. Under ordinary conditions some lateral movement is permitted wheel and axle assemblies in their relation to the truck frames which may be supported thereon, and this relative lateral motion affects to some degree the operation of the brake rigging which ordinarily is supported from the truck frame.

The general object of my invention is to devise a brake arrangement suitable for application to railway car trucks wherein the brake rigging may be so supported as to have lateral movement with the wheel and axle assemblies, thus maintaining the brake shoes substantially in alignment with the wheels at all times regardless of relative lateral motion that may take place between the wheel and axle assemblies and the truck frame supported thereon.

A more specific object of my invention is to devise a brake arrangement which may be dead ended from a truck frame member but otherwise supported from a special brake frame more or less independently of the truck frame, each wheel and axle assembly carrying its own brake frame.

A different object of my invention is to devise such a brake arrangement as that just described wherein the brake means for the respective wheel and axle assemblies may be dead ended at opposite sides of the truck bolster in the same longitudinal plane, thus avoiding the application of torque forces to said bolster.

My invention also contemplates a clasp brake arrangement wherein a fulcrum from the car body may be associated with the braking means of one wheel and axis assembly, while a body brake connection may be associated with the braking means of the other wheel and axle assembly for actuation of the brakes.

In the drawings, Figure 1 is a top plan view of the railway car truck embodying my invention.

Figure 2 is a side elevation of the truck and brake arrangement shown in Figure 1, partly in section, the section being taken substantially in the longitudinal plane indicated by the line 2—2 of Figure 1, and Figure 3 is an end view of the truck and brake arrangement shown in Figures 1 and 2, taken from the right as seen in those figures.

For the sake of simplicity, in each of the figures certain details may be omitted where they are more clearly shown in other views.

Figure 4:
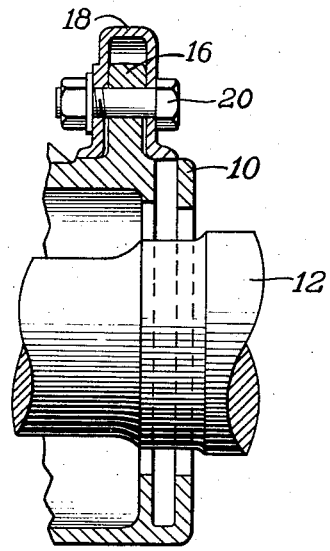
Figures 4 and 5 are fragmentary sectional views through one of the journal boxes illustrating the connection of the associated brake frame thereto, Figure 4 being taken in a vertical transverse plane substantially bisecting the box, and Figure 5 being taken in a longitudinal vertical plane substantially bisecting said box.
Figure 5:
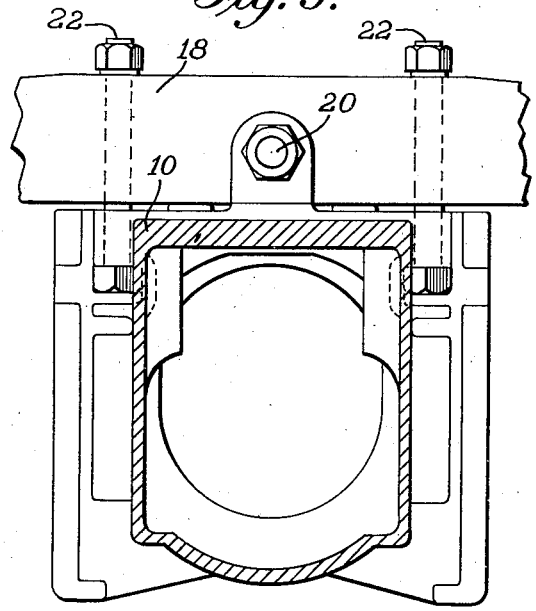

Describing the structure in detail, the truck frame may comprise the usual side members 2, 2 between which may be connected in usual manner a bolster 4 each end of which may be received in a bolster opening 5 of the adjacent side frame. Each side member has at its opposite ends pedestal jaws 6, 6 defining pedestal openings 8, 8 for connection in usual manner to journal boxes 10, 10 at opposite ends of each wheel and axle assembly 12. In the arrangement shown each journal box has guiding engagement within the adjacent pedestal jaws 6, 6, and at its inboard end each journal box 10 has a centrally positioned upstanding lug 16 which may project upwardly affording securing means for the superposed brake frame generally designated 18 between the inboard and outboard webs or flanges of the inverted U-section thereof. The brake frame 18 appears in plan as a generally rectangular frame the opposite ends of which may be supported on journal boxes 10, 10 at respective ends of each wheel and axle assembly. As best seen in Fig. 4, the end member of each brake frame may be of inverted U-section, between the inboard and outboard webs of which may project the before-mentioned lug 16, said lug being secured to said frame as by the transverse bolt and nut assembly 20, and said frame may be further secured to the adjacent journal box by means of vertical nut and bolt assemblies 22, 22 secured at the inboard edge of each box adjacent opposite sides thereof. By this means the brake frame 18 is firmly fixed to the journal boxes at opposite sides of the supporting wheel and axle assembly.

Figure 1:
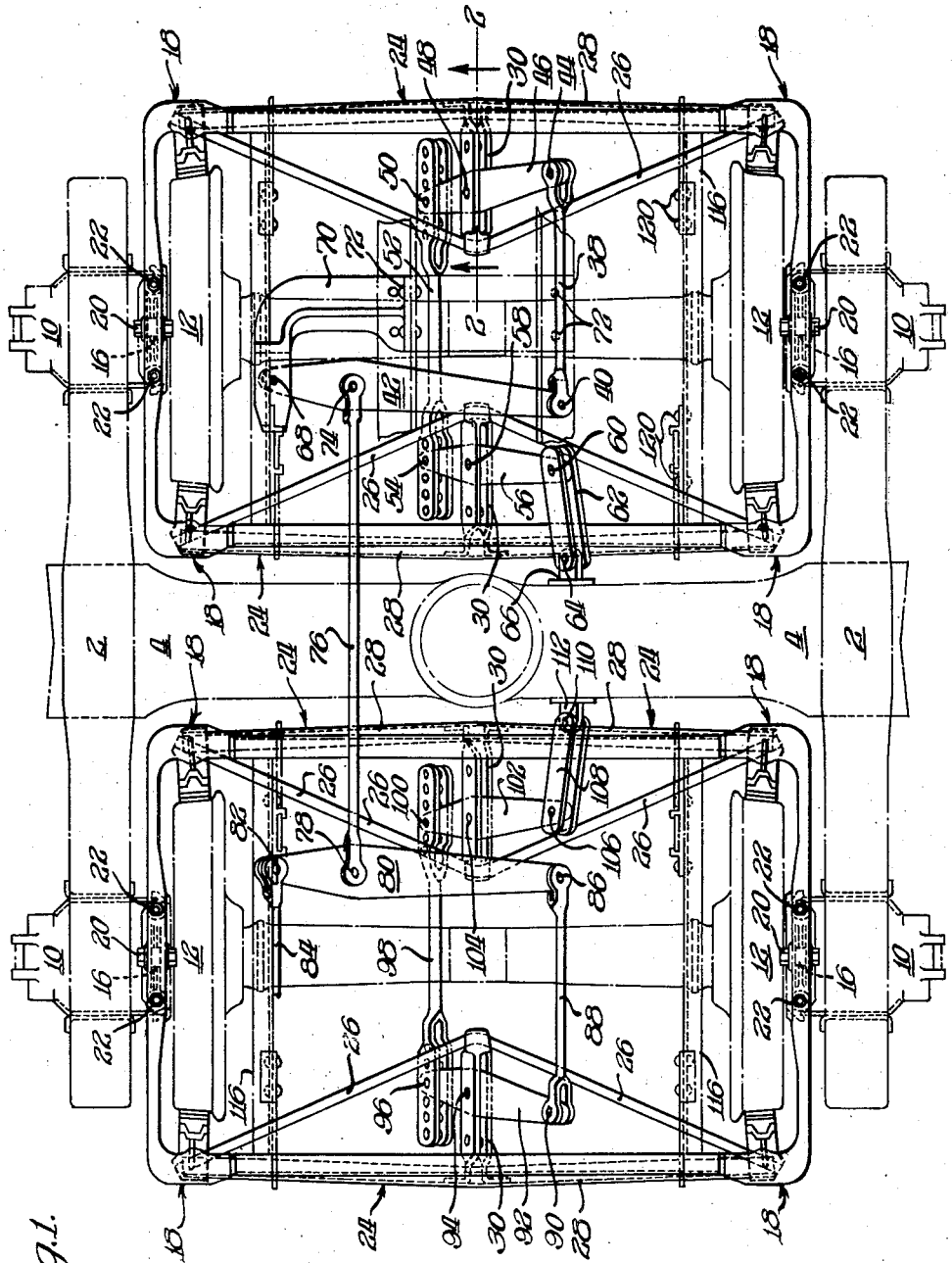

My novel brake arrangement may comprise truss type brake beams 24, 24 supported at opposite sides of each wheel and axle assembly, each brake beam comprising a tension member 26, a compression member 28, and a strut 30. Brake heads 32, 32 with associated friction shoes 34, 34 are supported at the ends of said beams and are arranged for engagement with the periphery of the adjacent wheels. Each brake beam 24 may be supported from opposite corners of the adjacent brake frame by means of hangers 36, 36, the upper ends of which may have pivotal connection adjacent the corners of said frame, and the lower ends of which may have pivotal connection with the adjacent brake heads in usual manner. The brake rigging also comprises the pull rod 38 (Figure 1, right) which may be pivotally connected at its inner end as at 40 to one end of the dead operating lever 42. The opposite end of the pull rod 38 may have pivotal connection as at 44 with the live truck lever 46, and an intermediate point of said lever 46 may be pivotally connected as at 48 in the strut 30 of the adjacent beam. The opposite end of the live lever 46 may have pivotal and adjustable connection as at 50 with the jaw end of the pull rod 52 which may extend below the axle of the adjacent wheel and axle assembly and have pivotal connection at the opposite end thereof as at 54 with the dead brake lever 56. The lever 56 may be pivotally connected intermediate its ends as at 58 in the strut 30 of the adjacent beam, and its opposite end may have pivotal connection as at 60 to the link 62, the opposite end of which may have pivotal connection as at 64 to the lug 66 formed on the adjacent side of the bolster. The dead operating lever 42 may be fulcrumed at its opposite end as at 68 to the bracket 70 fixed as at 72, 72 to the center sill of the superposed car body, a fragmentary portion of which is shown in Figure 3. Intermediate its ends the dead lever 42 may have pivotal connection as at 74 with the pull rod 76 which may extend over the bolster 4 for pivotal connection at its opposite end as at 78 with the operating lever 80, said operating lever having a point at one end thereof pivotally connected as at 82 to the operating rod 84, and the opposite end of said rod may have connection in any convenient manner to the body brake (not shown). The opposite end of the operating lever 80 may have pivotal connection as at 86 to the pull rod 88, the opposite end of which may have pivotal connection as at 90 to the live truck lever 92. The live truck lever may be fulcrumed intermediate its ends as at 94 in the strut or fulcrum of the adjacent beam 24, and its opposite end may have pivotal and adjustable connection as at 96 to one end of the pull rod 98. The pull rod 98 may extend below the adjacent axle and the opposite end thereof may have pivotal and adjustable connection as at 100 to the dead brake lever 102 which may be fulcrumed intermediate its ends as at 104 in the strut of the adjacent beam 24, and its opposite end may have pivotal and adjustable connection as at 106 to the link 108 which may have its opposite end pivotally connected as at 110 to the lug 112 formed on the adjacent side of the bolster 4. It may be noted that the lugs 66 and 112 on the sides of the bolster 4 are formed at points directly opposite each other, said lugs being so disposed in order to prevent the application of torque forces to the bolster when the brakes are actuated as will be readily apparent to those skilled in the art.

Each brake frame may have inboard each wheel a strut 116 parallel with the adjacent end member of the brake frame and secured at opposite sides thereof. Safety means for the brake rigging may be provided in the form of L-shaped brackets 118, 118, the opposite ends of which may be fixed as at 120, 120 to the adjacent strut 116, and the horizontal leg of each L-shaped bracket 118 may underlie the adjacent brake beam 24. The transverse members of each brake frame may be downwardly offset along the central portion thereof, as best seen in the end view of Figure 3, in order to prevent interference with the associated brake rigging. Combination safety and balance means for the brake rigging may be provided in the form of levelling links 121, 121, each link being connected at one end thereof as at 122 to the strut 30 of the adjacent beam, and at the opposite end thereof as at 124 to the jaw end of the pull rod 52, and similar links 126, 126 each being connected at one end thereof as at 128 to the strut 30 of the adjacent beam, and at the opposite end thereof as at 130 to the jaw end of the pull rod 98.

In operation, power means (not shown) mounted on the associated car body will actuate the operating rod 84 (Figure 1, left) moving said rod to the left and supplying movement of translation to the operating lever 80. Said movement of the operating lever 80 will actuate the brakes associated with the adjacent wheel and axle assembly through the pull rod 88, and said movement of the operating lever 80 will cause the pull rod 76 to move to the left, thus actuating the brake rigging at the opposite end of the truck through the dead lever 42 as will be clearly apparent to those skilled in the art.

In my novel arrangement, the brake frame 18 at each end of the truck is supported on journal boxes 10, 10 at opposite ends of the adjacent wheel and axle assembly, and said wheel and axle assembly, with its associated journal boxes, is permitted lateral movement with respect to the adjacent truck frame which may be supported thereon. The connection of the brake frame between the journal boxes at opposite ends of each assembly permits the brake rigging to follow the lateral movements of the wheel and axle assembly, thus affording close alignment of the brake heads and brake shoes with the peripheries of the associated wheels. The dead ending of the rigging at each end of the truck will not interfere with the relative lateral motion between the truck frame and the wheel and axle assembly inasmuch as said dead ending comprises a pivotal connection to said bolster.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a truck frame, a car body supported thereon, supporting wheel and axle assemblies, journal boxes associated with each assembly, brake frames mounted on the journal boxes of the respective assemblies, and brake rigging comprising brake beams hung from said brake frames at opposite sides of each assembly, live truck levers associated with the beams outwardly of the wheels, dead truck levers associated with the beams intermediate the wheels, a connection between the live and dead truck levers associated with each assembly, a dead operating lever fulcrumed from said car body and associated with one of said live truck levers, a live operating lever associated with the other of said live truck levers, a connection between said operating levers, means for actuating said live operating lever, said dead truck levers being fulcrumed intermediate the wheels from opposite sides of a transverse member of said truck frame, and safety means hung from said brake frames intermediate the wheels and underlying respective ends of each brake beam.

2. In a brake arrangement for a railway car truck, a truck frame comprising side members and a bolster, a car body supported on said bolster, supporting wheel and axle assemblies, journal boxes at opposite ends of each assembly affording connection to said truck frame, a brake frame mounted on the journal boxes associated with each assembly, and brake rigging hung from said brake frames and comprising brake beams supported at opposite sides of each assembly, interconnected live and dead truck levers associated with respective beams of each assembly, links connecting said dead truck levers to said bolster, interconnected live and dead operating levers connected to said live truck levers respectively, said dead operating lever being fulcrumed at one end thereof from said car body, means for actuating said live operating lever, each of said brake frames comprising a plurality of struts arranged longitudinally of the truck intermediate the wheels of the associated assembly, and brake beam safety means supported from said struts and underlying opposite ends of each of the associated beams.

3. In a brake arrangement for a railway car truck, a truck frame comprising side members and a transverse load carrying member, spaced supporting wheel and axle assemblies, journal boxes affording connecting means between said side members and said assemblies, brake frame supported from the journal boxes associated with each assembly, a car body supported on said load carrying member, and brake rigging comprising brake beams supported from said brake frames at opposite sides of each assembly, dead truck levers fulcrumed in the beams intermediate the wheels, live truck levers fulcrumed in the beams outwardly of the wheels, pull rods connecting the live and dead truck levers associated with the respective assemblies, pull rods connecting said dead truck levers to opposite sides of said load carrying member, live and dead operating levers connected to said live truck levers respectively and connected to each other, and means for actuating said live operating lever, said dead operating lever being fulcrumed at one end thereof from said car body.

4. In a brake arrangement, a vehicle frame, a car body supported therefrom, spaced supporting wheel and axle assemblies, brake beams suspended at opposite sides of each assembly, live truck levers associated with the beams outwardly of said assemblies, dead truck levers associated with the beams inwardly of said assemblies, means interconnecting the live and dead levers associated with each assembly, interconnected live and dead operating levers disposed intermediate the sides of said frame, said dead operating lever being fulcrumed from the car body, and an operative connection between each operating lever and the adjacent live truck lever.

5. In a brake arrangement, a vehicle frame, a car body supported therefrom, spaced supporting wheel and axle assembles, brake beams suspended at opposite sides of each assembly, live truck levers associated with the beams outwardly of said assemblies, dead truck levers associated with the beams inwardly of said assemblies, means interconnecting the live and dead levers associated with each assembly, interconnected live and dead operating levers disposed intermediate the sides of said frame, said dead operating lever being fulcrumed at one end thereof from the car body, and an operative connection between each operating lever and the adjacent live truck lever.

6. In a brake arrangement, a vehicle frame, spaced supporting wheel and axle assemblies, brake beams supported at opposite sides of each assembly, live truck levers associated with the beams outwardly of said assemblies, dead truck levers associated with the beams inwardly of said assemblies, a connection between the live and dead truck levers associated with each assembly, interconnected live and dead operating levers disposed intermediate the sides of said frame, and an operative connection between each operating lever and the adjacent live truck lever.

7. In a brake arrangement, a vehicle frame, spaced supporting wheel and axle assemblies, brake beams supported at opposite side of each assembly, live truck levers associated with the beams outwardly of said assemblies, dead truck levers associated with the beams inwardly of said assemblies, a connection between the live and dead truck levers associated with each assembly, interconnected live and dead operating levers disposed intermediate the sides of said frame, and an operative connection between each operating lever and the adjacent live truck lever, said dead operating lever being afforded a fixed fulcrum at one end thereof.

8. In a brake arrangement for a railway car truck, a truck frame comprising side members and a transverse load carrying member, a car body supported thereon, spaced supporting wheel and axle assemblies, journal boxes affording connecting means between said assemblies and said side members, a brake frame supported on the journal boxes associated with each assembly, and brake rigging comprising hangers hung from said brake frames and supporting brake beams at opposite sides of each assembly, live and dead levers associated with the brake beams of each assembly, pull rods connecting corresponding ends of the brake levers associated with each assembly, said dead brake levers being fulcrumed from said load carrying member, live and dead operating levers connected to said live brake levers respectively and connected to each other, and means for actuating said live operating lever, said dead operating lever being fulcrumed at one end thereof from said car body.

9. In a brake arrangement for a railway car truck, a truck frame comprising side members and a bolster, a car body supported on said bolster, supporting wheel and axle assemblies, journal boxes at opposite ends of each assembly affording connection to said truck frame, a brake frame mounted on the journal boxes associated with each assembly, and brake rigging hung from said brake frames and comprising brake beams supported at opposite sides of each assembly, interconnected live and dead truck levers associated with respective beams of each assembly, links connecting said dead truck levers to said bolster, interconnected live and dead operating levers connected to said live truck levers respectively, said dead operating lever being fulcrumed from said car body, means for actuating said live operating lever, and safety means hung from said brake frame and underlying opposite ends of each of said beams.

10. In a railway car truck, a truck frame comprising side members and a bolster, a car body supported on said bolster, supporting wheel and axle assemblies, journal boxes associated with said assemblies, brake frames mounted on the journal boxes associated with the respective assemblies, and brake rigging hung from said brake frames and comprising brake beams supported at opposite sides of each assembly, dead truck levers fulcrumed in the beams intermediate the wheels, live truck levers fulcrumed in the beams outwardly of the wheels and connected to said dead truck levers respectively, means connecting said dead truck levers to opposite sides of said bolster adjacent one end thereof, interconnected live and dead operating levers connected to said live truck levers respectively, and means for actuating said live operating lever, said dead operating lever being fulcrumed at one end thereof from said car body.

11. In a brake arrangement for a railway car truck, a truck frame comprising side members and a bolster, a car body, spaced supporting wheel and axle assemblies, journal boxes associated therewith, a brake frame for each assembly supported on the adjacent boxes, and brake rigging hung from said frames and comprising brake beams supported at opposite sides of each assembly, dead truck levers fulcrumed in the beams intermediate the wheels, live truck levers fulcrumed in the beams outwardly of the wheels, a below-axle pull rod connecting the live and dead truck levers of each assembly, means connecting each of said dead truck levers to correspondingly placed fulcrums at opposite sides of said bolster, interconnected live and dead operating levers connected to said live truck levers respectively, said dead operating lever being fulcrumed from said car body, and means for actuating said live operating lever.

12. In a brake arrangement for a railway car truck, a truck frame, a car body supported thereon, supporting wheel and axle assemblies, journal boxes associated with each assembly, brake frames mounted on the journal boxes of respective assemblies, and brake rigging comprising brake beams supported from said brake frames at opposite sides of each assembly, live truck levers fulcrumed from the beams at the ends of the truck, dead truck levers fulcrumed from the beams intermediate the wheels, pull rods connecting the corresponding ends of the live and dead levers associated with each assembly, operating levers associated with said live levers respectively and connected intermediate their ends to each other, said dead truck levers being fulcrumed from the truck frame, one of said operating levers being fulcrumed from said car body, and means for actuating the other of said operating levers.

13. In a brake arrangement, a vehicle frame, a car body mounted thereon, spaced supporting wheel and axle assemblies, brake beams supported at opposite sides of each assembly, interconnected live and dead truck levers fulcrumed in respective beams associated with each assembly, said dead levers being connected to said frame, interconnected live and dead operating levers disposed intermediate the sides of said frame, the dead operating lever being fulcrumed at one end thereof from the car body, and an operative connection between each operating lever and the adjacent live truck lever.

14. In a brake arrangement for a railway car truck, a truck frame comprising side members and a bolster, a car body supported on said bolster, supporting wheel and axle assemblies, journal boxes at opposite ends of each assembly affording connection to said truck frame, a brake frame mounted on the journal boxes associated with each assembly, and brake rigging hung from said brake frames and comprising brake beams supported at opposite sides of each assembly, interconnected live and dead truck levers associated with respective beams of each assembly, links connecting said dead brake levers to said bolster, interconnected live and dead operating levers connected to said live truck levers respectively, said dead operating lever being fulcrumed from said car body, and means for actuating said live operating lever.

15. In a brake arrangement, a vehicle frame, spaced supporting wheel and axle assemblies, brake beams suspended at opposite sides of each assembly, interconnected live and dead truck levers fulcrumed in respective beams associated with each assembly, said dead levers being connected to said frame, interconnected live and dead operating levers disposed intermediate the sides of said frame, the dead operating lever being afforded a fixed fulcrum at one end thereof, and an operative connection between each operating lever and the adjacent live truck lever.

16. In a brake arrangement, a vehicle frame, spaced supporting wheel and axle assemblies, journal boxes associated therewith, a car body mounted on said frame, brake frames mounted on respective journal boxes, and brake rigging hung from the brake frames and comprising brake beams supported at opposite sides of each assembly, interconnected live and dead truck levers associated with respective beams of each assembly, means connecting the dead truck levers to the truck frame, live and dead operating levers connected to said live truck levers respectively, means interconnecting said operating levers intermediate their ends, and means for actuating said live operating lever, said dead operating lever being fulcrumed from the car body.

17. In a brake arrangement, a vehicle frame, spaced supporting wheel and axle assemblies, journal boxes associated therewith, a car body mounted on said frame, brake frames mounted on respective journal boxes, and brake rigging hung from the brake frames and comprising brake beams supported at opposite sides of each assembly, interconnected live and dead truck levers associated with respective beams of each assembly, means connecting the dead truck levers to the truck frame, interconnected live and dead operating levers connected to said live truck levers respectively, and means for actuating said live operating lever, said dead operating lever being fulcrumed at one end thereof from the car body.

WALTER H. BASELT.